United States Patent [19]

Schockmel

[11] 4,397,962

[45] Aug. 9, 1983

[54] ENERGY STORAGE ELEMENT AND METHOD OF MAKING SAME

[75] Inventor: R. Schockmel, Esch, Luxembourg

[73] Assignee: Arbed S.A., Luxembourg, Luxembourg

[21] Appl. No.: 342,395

[22] Filed: Jan. 25, 1982

[30] Foreign Application Priority Data

Jan. 27, 1981 [LU] Luxembourg .......................... 83100

[51] Int. Cl.$^3$ .......................................... C04B 35/04
[52] U.S. Cl. .................................................. 501/112
[58] Field of Search ................................ 501/112, 121

[56] References Cited

U.S. PATENT DOCUMENTS 2,846,326  8/1958  Pearson et al. ..................... 501/112

FOREIGN PATENT DOCUMENTS 453626  6/1968  Switzerland ........................ 501/126
1262465  2/1972  United Kingdom ................ 501/126

*Primary Examiner*—James Poer
*Attorney, Agent, or Firm*—Karl F. Ross; Herbert Dubno

[57] ABSTRACT

An energy-storage element, i.e. a body of high heat capacity capable of storing thermal energy and especially electrothermal energy, consists of 50–95% magnesium oxide, 5–50% iron oxide and a chemical binder, the mean particle size of the magnesium oxide lying between 0.1 and 4 mm and that of the iron oxide below 0.5 mm, preferably between 0.01 and 0.2 mm.

9 Claims, 2 Drawing Figures

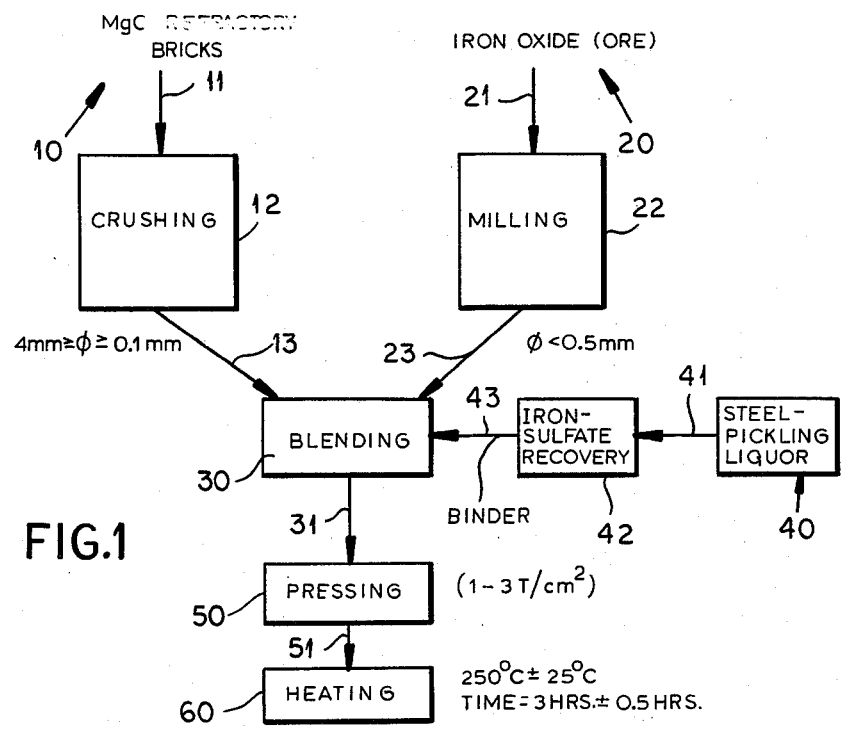
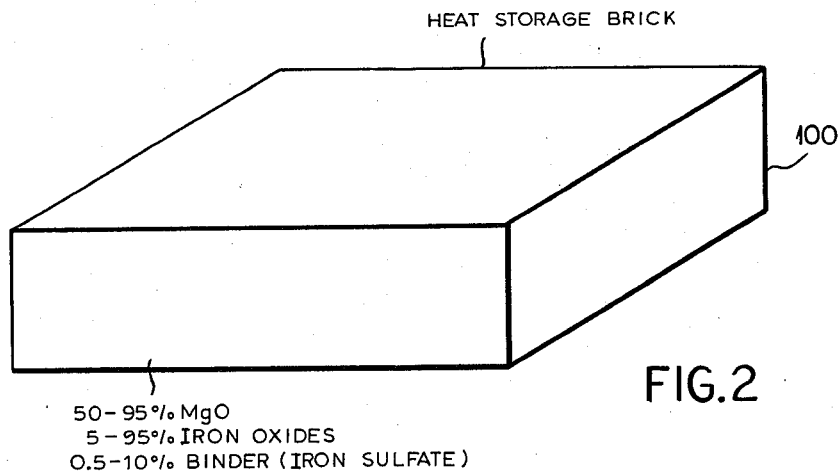

ENERGY STORAGE ELEMENT AND METHOD OF MAKING SAME

FIELD OF THE INVENTION

My present invention relates to storage elements for retaining thermal energy and, more particularly, to heat-storage bodies, and to a method of making same.

The invention thus relates to bodies of various shapes, e.g. blocks, tubes, packings and the like which can be heated by thermal energy and are capable of retaining the thermal energy until this energy is transferred, e.g. to a fluid. Such bodies are especially adapted for the storage of electro-thermal energy.

BACKGROUND OF THE INVENTION

In a wide variety of applications in industry, chemical installations, metallurgical plants and, more generally, wherever thermal energy is generated and used, it is desirable to provide for the storage of such thermal energy when an excess is produced and for the subsequent tapping of the stored thermal energy.

For example, storage and recuperator furnaces or ovens have been provided heretofore in which bodies of high thermal capacity are heated, e.g. by a gas during periods of excess heat development and subsequently transfer the stored heat to a fluid at a lower temperature when consumption of the heat is desirable.

The heat-storage body can be composed of refractory material, e.g. fire clay, sillimanite, mullite, magnesite, chrome-magnesite, chrome ore, zirconia, whose densities and melting points increase in the given order.

These materials vary with respect to the significant parameters involved in their use as heat storage materials, namely, the specific heat (j·h/kg degree), thermal conductivity (W/m·degree) and the heat content (J/kg or J/degree.l).

Fire clay, for example, at 1200° C. has approximately twice the specific heat of the zirconia while its thermal conductivity coefficient is substantially less than that of zirconia.

Magnesite has a specific heat which is comparable with that of fire clay but has three times greater thermal conductivity.

It is thus desirable in producing heat-storage bodies, e.g. bricks, of refractory material to obtain the best combination of properties at a reasonable or low cost.

In British Pat. No. 1,262,475, for example, refractory materials are described for the thermal storage cores in electrical storage heaters and the problem with low density refractory materials is discussed. As a solution to the problem, this patent proposes a heat-storage body which consists essentially 100% of $Fe_2O_3$.

In this system, the oxide is compacted with a pressure which is upwards of 300 kg per $cm^2$ and can be less than 800 kg per $cm^2$ to yield a body of high thermal conductivity. In addition, the reference indicates that one can use $Fe_2O_3$ or $Fe_3O_4$, the latter being oxidized to $Fe_2O_3$. This oxidation can be effected during the sintering step which is applied after pressing.

The iron is thus in its highest oxidation state or is transformed into the highest oxidation state, eliminating difficulties with subsequent oxidation in operation with available oxygen which might tend to alter the physical chemical characteristics of the body. The trivalent iron thus forms a relatively stable product.

Swiss Pat. No. 453,626, on the other hand, discloses that the oxidation of $Fe_3O_4$ at 750° C. in air is surprisingly so minimal that the use of this material as a heat-storage body is recommended, the $Fe_3O_4$ being cast into bricks.

Whether one choses to believe one or the other teaching, it is clear that unless the iron oxide is in the pure form, in which it can only be obtained at extremely high cost, any body which consists predominantly of iron oxide runs the risk of being susceptible to alterations in the physical chemical parameters during use and damage to the bricks or the like.

OBJECTS OF THE INVENTION

It is the principal object of the present invention to provide a thermal-storage element which can be fabricated at low cost and has improved refractory and thermal storage characteristics, chemical stability and operational life.

Another object of the invention is to provide an improved element for the purposes described heretofore which can be readily fabricated of low cost materials and which obviates disadvantages of earlier elements utilized for the same purpose.

Still another object of this invention is to provide an improved method of making a thermal-storage element or body.

SUMMARY OF THE INVENTION

These objects and others which will become apparent hereinafter are attained, in accordance with the present invention, with a thermal-storage element which consists essentially of 50-95% by weight magnesium oxide, 5-50% by weight iron oxide and a chemical binder, preferably in an amount of 0.5-10% by weight, such that the mean particle size of the magnesium oxide is between 0.1 mm and 4 mm and that of the iron oxide is less than 0.5 mm and preferably is between 0.01 and 0.2 mm.

While the presence of a chemical binder is desirable and the preferred chemical binder is an iron sulfate which is obtained from metal-pickling liquors as will be described hereinafter, the proportion of the binder is not critical. The critical parameters of the present invention are the particle size range given above and the proportions of the magnesium oxide and the iron oxide.

Surprisingly, I have found that the magnesium oxide required for the present invention can advantageously be obtained by comminuting used refractory bodies (bricks), i.e. refractory bricks which are recovered during the dismantling of metallurgical or glass furnaces, troughs and other facilities.

Such bricks usually contain more than 85% by weight magnesia (MgO).

Of course, this does not mean that pure MgO need not be used or that the MgO cannot be obtained from some other source. Since cost price is an important factor in the technology of refractory heat-storage materials, the higher price for pure MgO and the higher costs for energy required to sinter this material at high temperatures, would appear to preclude general use of the pure MgO. The energy costs required for sintering MgO obtained in the form of used refractory materials is minimal.

According to a feature of the invention, the thermal-storage element is obtained by pressing a blended mass of the comminuted used vessel and furnace lining bricks containing MgO with finely divided iron ore, the latter serving as the carrier of the iron oxides, the pressed body being then subjected to heating at a comparatively low temperature for a relatively brief time.

The binder which is added to the blend can be iron sulfate.

The invention allows the reuse of magnesium oxide refractories by comminuting them and introducing them into the pressed mass without any prior treatment. The operating temperatures of the thermal-storage elements of the present invention generally are of the order of 700° C. and hence expensive sintering of the pressed body at extremely high temperatures is unnecessary.

The use of the finely divided iron ore as the iron oxide source in accordance with the invention not only has the advantage that iron ore is a relatively low cost product, but finely divided iron oxide of this type is readily available from systems in which hydraulic transport of ore is carried out. The ore need only be milled, when recovered from hydraulic transport systems, to a mean particle size of about 50 microns, for example, and little further treatment is required, if any. It has been found to be advantageous to utilize enriched ores, i.e. ores which have previously been transformed into ore concentrates.

One of the important advantages of the use of finely divided iron ore as the iron oxide for the purposes of the present invention is that the iron oxide particles appear to fill gaps or interstices in the magnesia structure and to correct for wide variations in the iron content of the recycled magnesia refractories.

The refractory bricks which are comminuted to serve as the magnesia source in accordance with the present invention generally contain iron oxides as the subordinate portion. The iron oxide content of these bricks may vary widely and by adjusting the total iron oxide content with the finely divided iron ore to the requirements of the present invention, extremely homogeneous compositions can be obtained in spite of the fact that they derive from raw materials with fluctuating iron oxide contents.

Furthermore, the iron sulfate which is used is preferably an iron sulfate derived from steel-pickling liquors. The iron sulfate is precipitated in the conventional manner from the pickling liquor.

The iron sulfate thus obtained is, of course, of low cost since it is generally a waste product in the disposal of such pickling liquors.

The pressed body of the present invention can be subjected to a nonsintering heat treatment at a temperature between 120° and 250° C. (inclusive), ±25° C. and preferably of about 250° C.±25° C. for a comparatively brief time, say 3 hours ±0.5 hour. With conventional systems, firing or sintering at temperatures above 1300° C. are required.

The pressing step can utilize a press whose dies are shaped to conform to the configuration of the body to be produced, e.g. a brick, and capable of developing 1–3 metric tons per $cm^2$ of pressing pressure.

Preferably the pressing step is effected at 1.5 $t/cm^2 \pm 0.25$ $t/cm^2$.

The heat-storage elements of the present invention have been found to have an effective operating temperature range between 20° C. and 800° C., a specific gravity (bulk density) of about 3 kg/l, a heat capacity between 3500 and 3600 J/°C. 1, and a thermal conductivity of about 5 w/m.°C.

Preferably, the comminuted used refractory has a particle size distribution of the Fuller-Bolomey type and contains more than 85% by weight MgO.

BRIEF DESCRIPTION OF THE DRAWING

The above and other objects, features and advantages of the present invention will become more readily apparent from the following description, reference being made to the accompanying drawing in which:

FIG. 1 is a flow diagram, in block form, illustrating the process of the present invention; and FIG. 2 is a perspective view of a brick made by the method of the invention.

SPECIFIC DESCRIPTION

FIG. 1 of the drawing shows that magnesia-containing refractory bricks are obtained at 10 and are fed at 11 to a crushing stage 12 in which a Fuller-Bolomey particle size distribution is imparted to the bricks with the mean particle size lying between 0.1 mm and 4 mm. The crushed product, containing more than 85% by weight MgO, is fed to a blender 30 to which a iron ore concentrate is delivered at 23. The enriched iron oxide ore at 20 is fed at 21 to a mill 22 where it is ground to a particle size (mean) less than 0.5 mm.

The two components are blended at 30 together with a binder, iron sulfate, which is recovered from a steel-pickling liquor 40 by precipitation at 42, the waste liquor being delivered to the precipitator stage at 41. The binder is added to the blender as shown at 43.

After blending, the refractory mass is fed to a hydraulic press in which it is subjected to a pressure between 1–3 $t/cm^2$ and receives the desired shape. The pressed body is then heated to a temperature less than sintering temperature, e.g. a temperature of about 250° C.±25° C. for a period of about 3 hours ±0.5 h.

The highly stable brick 100 is shown in FIG. 2 and can be used in any of the heat-storage applications previously described.

SPECIFIC EXAMPLES

Starting Material:

Recovered magnesium oxide refractory brick, containing: 72.0% MgO and 25.3% FeO; particle size 0.2–2.8 mm. Particle Size Distribution according to Fuller-Bolomey Finely divided enriched iron ore containing: 94.0% $Fe_2O_3$; particle size 0.01–0.2 mm.

Iron sulfate containing: 28.5% FeO; 54.2% sulfate; 15% free $H_2SO_4$

In the Blended Mixture (approximately):
  64.0% MgO
  22.5% $Fe_2O_3$
  9.5% FeO
  3.0% $H_2O$ The brick was pressed at 1.5 $t/cm^2$ and heated for a period of 3 hours at 250° C. and permitted to stand in the closed oven for 18 hours to cool to room temperature.

The following were the physical parameters of the product:

Specific gravity (bulk density): 3.14 kg/l
specific heat: 1138 J h/kg °C.
heat capacity (content): 3562 J/°C. 1
thermal conductivity: 4–6.4 W/m °C.

Blocks made in accordance with this method were found to be far less expensive than earlier refractory blocks formed from iron oxide and the energy cost in producing the blocks was substantially lowered.

In addition, the method of the present invention represents a valuable means of disposing of waste brick from the metallurgical industry and the bricks are found to be especially effective as refractory elements in the recuperative heat exchangers of metallurgical furnaces and equipment.

I claim:

1. A refractory heat-storage element for the storage of thermal energy consisting essentially of 50-95% magnesium oxide, 5-50% iron oxide, and a chemical binder, the mean particle size of the magnesium oxide being between 0.1 mm and 4 mm and the mean particle size of the iron oxide being less than 0.5 mm, wherein the magnesium oxide is in the form of comminuted used refractory brick having a particle size distribution of the Fuller-Bolomey type and containing more than 85% MgO.

2. The storage element defined in claim 1 wherein the mean particle size of the iron oxide is between 0.01 mm and 0.2 mm.

3. The storage element defined in claim 2 wherein the iron oxide is in the form of enriched iron ore.

4. The storage element defined in claim 2 wherein the chemical binder is an iron sulfate recovered from a steel-pickling liquor.

5. A method of making a refractory body, for use as a heat-storage element, comprising the steps of blending 50-95% magnesium oxide, 5-50% iron oxide and a chemical binder to form a mass; pressing said mass at a pressure of substantially 1-3 t/cm² to provide a body having the shape of said element; and heating said body for a period of about 3 hours at a temperature of about 250° C., wherein said magnesium oxide is in the form of comminuted used magnesium oxide refractory brick containing iron oxide, and the quantity of iron oxide added to said blend is dimensioned to compensate for the iron oxide in the comminuted used bricks.

6. The method defined in claim 5 wherein the iron oxide is added in a form such that it fills interstices in said body.

7. The method defined in claim 5 wherein said chemical binder is obtained in the form of iron sulfate from a steel-pickling liquor.

8. The method defined in claim 7 wherein said iron oxide is an enriched iron ore.

9. A method of making a refractory body for electrothermal storage and release of heat, said method comprising the steps of:
   (a) comminuting used magnesium oxide furnace-lining brick containing iron oxide;
   (b) blending 50 to 95% of the comminuted used brick with 5 to 50% of iron oxide ore and adding iron sulfate to form a mixture consisting predominantly of MgO and the balance mostly of iron oxides;
   (c) pressing the mixture formed in step (b) at a pressure of substantially 1-3 t/cm² to shape the same into the configuration of said body; and
   (d) heating the pressed shaped mixture for a period of about 3 hours at a temperature of about 250° C.

* * * * *